(No Model.)
H. H. CHASE.
COW BAG PROTECTOR.
No. 486,766. Patented Nov. 22, 1892.
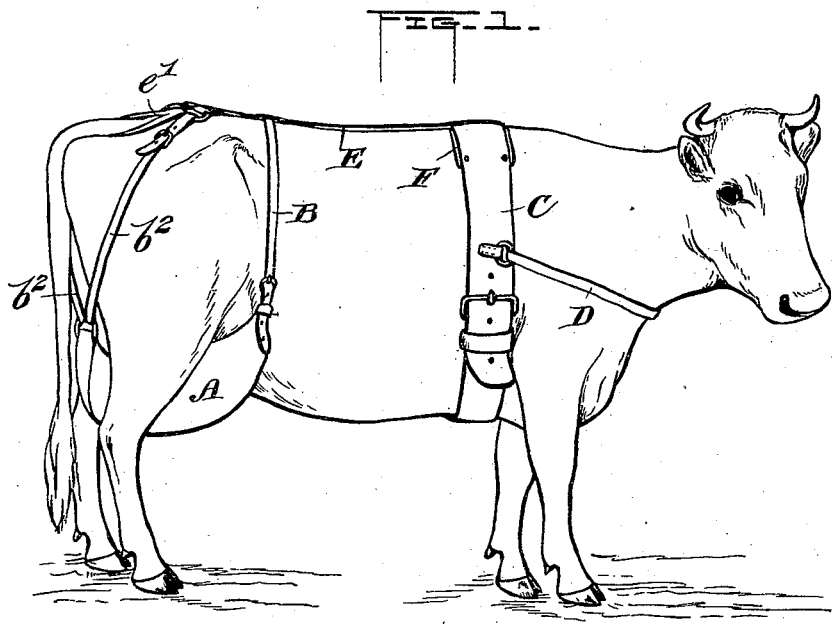
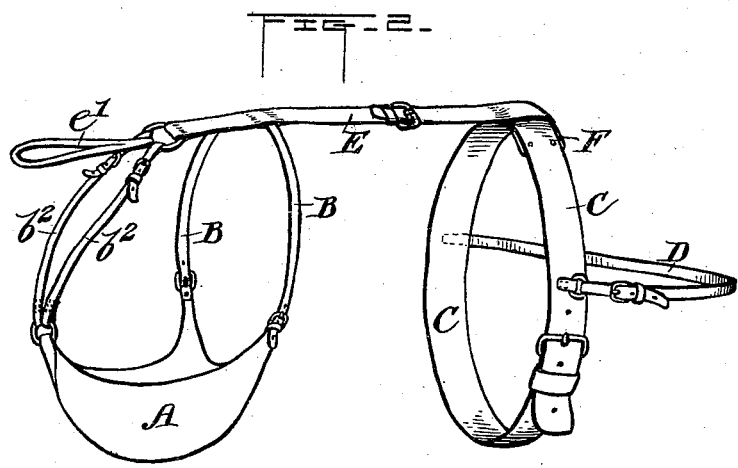
Witnesses
Severance
C. Hines
Inventor
Henry H. Chase
by E. J. Fenwick
Attorney

UNITED STATES PATENT OFFICE.

HENRY H. CHASE, OF DULUTH, MINNESOTA.

COW-BAG PROTECTOR.

SPECIFICATION forming part of Letters Patent No. 486,766, dated November 22, 1892.

Application filed February 23, 1892. Serial No. 422,545. (No model.)

*To all whom it may concern:*

Be it known that I, HENRY H. CHASE, a citizen of the United States, residing at Duluth, in the county of St. Louis and State of Minnesota, have invented certain new and useful Improvements in Cow-Bag Protectors; and I do hereby declare the following to be a full, clear, and exact description of the invention, such as will enable others skilled in the art to which it appertains to make and use the same.

My invention relates to a combined cow-bag protector and harness; and it consists in combining with an udder-protector similar to that shown in Letters Patent granted to me November 3, 1891, and numbered 462,664, a suitable harness for keeping the said udder-protector in proper position on the cow at all times and under all circumstances, as will be hereinafter described and specifically claimed.

I have found in using my cow-bag protector referred to in the above-mentioned Letters Patent that when the cow is grazing on a steep hillside or is walking either up or down on the same there is a tendency of the straps designed to hold the udder-protector in position to slide out of place and allow the protector to collapse more or less below the cow's bag, and thereby expose the bag to filth and cold and permit a calf to have access to the teats when such access is not desired.

In the accompanying drawings, Figure 1 represents my improved cow-bag protector applied to a cow; and Fig. 2 is a detail view of the same, showing the protector and supporting-harness.

A in the drawings represents my cow-bag protector proper, made of canvas, leather, cloth, or other suitable material of a size and shape to closely fit over and around the cow's bag to prevent entrance of filth at the rear of the protector or a calf having access to the teats. The construction of this bag is preferably the same as that shown in my patent hereinbefore mentioned and is held in place by extensible straps B, attached to an adjustable back-strap E, the said straps being applied on the body of the cow immediately forward of her hind legs and connected with buckles on the front ends of the udder-protector, whereby the protector can be readily unfastened for milking purposes and as readily fastened again after the milking operation is completed, and the protector is further supported by two rear adjustable supporting-straps $b^2$ $b^2$, connected by their lower ends to the rear end of the bag-protector and by their upper ends to the back-strap B, thereby adapting the protector to any-sized cow.

C is an adjustable surcingle applied around the cow's body immediately in rear of her front legs and provided with a suitable buckle, and to which other parts of the harness are attached. An adjustable breast-strap D, for the purpose of preventing the surcingle C from slipping and being drawn backward out of place, is passed around the front of the cow and suitably attached by its ends to opposite sides of the surcingle C. The back-strap E extends from the surcingle C to a point a short distance from the rear end of the cow's back, and is provided at its rear end with a ring or buckle, to which are attached the rear supporting extensible straps $b^2$ $b^2$, as shown. To this ring or buckle a crupper $e'$ may be attached, the said crupper passing under and around the root of the cow's tail and fastened in the same manner as an ordinary crupper. The back-strap E can be shortened or lengthened by being divided and one of its ends formed with an ordinary buckle, so as to perfectly adapt it to cows of different lengths.

F is a stiffening-pad made of wood or metal and applied to the upper portion of the surcingle C and fits the ridge on a cow's back and prevents the surcingle from moving sidewise on the cow's back, and thereby keeps the protector in proper position.

It will be observed that by my invention a very simple, cheap, and effective cow-bag protector is provided, which will be held in exact position on the cow at all times and in whatever position the cow may be standing or walking, and that the protector will serve as an effective calf-weaner, and the calf can be allowed to "run" with the cow without possibility of accidentally getting access to the cow's teats. It will also be observed that a cow provided with my protector, which is held closely around her bag by my improved harness, cannot be sucked by a calf and is prevented from sucking herself.

What I claim as my invention is—

The within-described combined cow-bag protector and holding-harness, comprising the protector A for receiving the bag of a cow, a central back-strap E, having a rearwardly-extended attaching portion to which a connecting-ring is fastened, extensible supporting-straps B, attached to the central back-strap some distance forward of its rear end and to the front ends of the cow-bag protector, separated extensible rear supporting-straps $b^2$, attached to the ring on the extended portion of back-strap E and to the rear end of the cow-bag protector, the crupper $e'$, also attached to the ring of the back-strap E, an extensible surcingle C, adapted to pass around a cow's body immediately in rear of the front legs and attached to the back-strap, and an extensible strap D, adapted to pass around a cow's breast and attached to the opposite sides of the surcingle, the whole serving for holding the protector in proper position around the cow's bag in whatever position the cow may be standing, and the construction admitting of the device being adapted by adjustment to different-sized cows, substantially as described.

In testimony whereof I hereunto affix my signature in presence of two witnesses.

HENRY H. CHASE.

Witnesses:
C. O. BALDWIN,
H. R. ELLIOTT.